United States Patent [19]

Anderberg et al.

[11] Patent Number: 5,573,566
[45] Date of Patent: Nov. 12, 1996

[54] METHOD OF MAKING A QUARTZ DOME REACTOR CHAMBER

[75] Inventors: Dane H. Anderberg, Phoenix; Lewis C. Barnett, Tempe, both of Ariz.

[73] Assignee: Advanced Semiconductor Materials America, Inc., Phoenix, Ariz.

[21] Appl. No.: 451,926

[22] Filed: May 26, 1995

[51] Int. Cl.[6] .................................... C03B 23/023
[52] U.S. Cl. ...................... 65/102; 65/71; 65/106; 65/107; 65/109; 65/111; 65/120; 65/256; 65/271; 65/273; 65/285; 65/287; 65/289; 65/290; 65/291; 65/302; 425/110; 425/111; 425/112; 425/117
[58] Field of Search ...................... 65/102, 106, 107, 65/109, 71, 302, 256, 273, 120, 111, 291, 290, 289, 271, 285, 287; 425/110, 111, 112, 117

[56] References Cited

U.S. PATENT DOCUMENTS

| | | |
|---|---|---|
| 2,377,946 | 6/1945 | Leary ............................ 65/107 |
| 3,037,324 | 6/1962 | Carson .......................... 65/290 |
| 4,247,319 | 1/1981 | Hofmann ........................ 65/271 |
| 4,854,263 | 8/1989 | Chang et al. . | 
| 4,920,918 | 5/1990 | Adams et al. . |
| 5,044,943 | 9/1991 | Bowman et al. . |
| 5,085,887 | 2/1992 | Adams et al. . |
| 5,108,792 | 4/1992 | Anderson et al. ............ 427/248 |
| 5,194,401 | 3/1993 | Adams et al. . |

*Primary Examiner*—Donald E. Czaja
*Assistant Examiner*—Michael Philip Colaianni
*Attorney, Agent, or Firm*—Knobbe, Martens, Olson & Bear

[57] ABSTRACT

A method of making a quartz dome for a reactor chamber from a substantially flat quartz disk. The quartz disk is placed on a graphite ring which is rotated. The quartz disk is heated until the disk is softened slightly and it begins to slump. The softened portion of the disk is drawn by a change in pressure to contact a fixed wiper blade. The wiper blade controls the size and shape of the deformation of the quartz disk to form the dome surface.

20 Claims, 4 Drawing Sheets

METHOD OF MAKING A QUARTZ DOME REACTOR CHAMBER

BACKGROUND OF THE INVENTION

1. Field of the Invention

The present invention relates to a reactor system for semiconductor processing and, in particular, to a dome reactor chamber.

2. Description of the Relevant Art

In the course of constructing a semiconductor wafer, a variety of procedures and processes often involve placing the wafer within an enclosed reactor chamber. For instance, the reactor chamber may be used during the growth of an epitaxial silicon layer, or the formation of a thermal oxide or thermal nitride layer over a silicon layer. Additionally, the reactor chamber is often used in high temperature and high or low pressure environments for processes such as chemical vapor depositions and thermal annealing of integrated circuit structures already formed on the wafer.

Prior semiconductor processing systems typically included a reactor chamber and a gas, heat and coolant source. The reactor chamber is used to provide a controlled environment for the desired processing of the semiconductor wafer. The gas source provides purging and reactant gases to the reactor chamber. The heating source is typically located outside of the walls of the reactor chamber and it transmits energy through the chamber walls to heat the wafer positioned within the reactor chamber. The wafer is often mounted on a support structure which serves as a susceptor to absorb energy transmitted into the chamber and to convey the resulting heat to the wafer being processed. The coolant usually flows over the outer surface of the chamber to minimize thermal expansion and distortion of the chamber.

Prior reactor chambers are frequently formed of quartz because quartz has a high melting point and low coefficient of thermal expansion. This allows the reactor chamber to withstand high temperatures, often over 1100° C., used in some processes such as chemical vapor depositions (CVD) because the quartz has a melting point generally within the range of 1,300° to 2,000° C. The quartz also permits the heat from the heat source to transfer through the walls of the reactor chamber to heat the semiconductor wafer.

Prior reactor chambers are typically cylindrical, either over the entire chamber length or over a substantial portion of the chamber length, in order to withstand low pressure processing of the semiconductor wafer. The cylindrical reactor chamber allows for low pressure processing of the wafer because the stress caused by the pressure differential is uniformly distributed along the walls of the reactor chamber. The cylindrical reactor chamber also distributes the stress in the walls uniformly despite variations in wall thickness. The uniform distribution of stress is desirable because it reduces stress concentrations and minimizes the possibility of cracks, breaks or other damage to the walls of the reactor chamber during low pressure processing of the wafer.

The cylindrical walls, however, undesirably impair the uniform flow of the reactant gases over the surface of the semiconductor wafer because the flow rates of the gases are higher over some portions of the wafer and lower over other portions of the wafer. This causes the undesirable non-uniform coating or processing of the wafer, which impairs the integrity of the semiconductor wafer.

It is known to increase the thickness of the chamber walls to withstand the increased stress in the chamber caused by the low pressure processing of the wafer. The increasing thickness of the walls, however, undesirably increases the thermal insulation of the reactor chamber. The effectiveness of the coolant, which is typically air, in reducing the temperature of the chamber walls is reduced because it cannot effectively cool the inner surface of the chamber walls. The hotter inner surface tends to expand more rapidly than the cooler outer surface, and the uneven temperature distribution may cause the chamber walls to crack or break.

As disclosed in U.S. Pat. No. 4,920,918 issued to Adams, et al., a reactor chamber may be provided with a plurality of reinforcing gussets fixed to the outer surface of the reactor chamber to permit low pressure processing of the semiconductor wafer. The gussets provide additional strength to avoid the distortion of the walls of the reactor chamber during low pressure procedures without increasing the wall thickness of the reactor chamber. The gussets, however, undesirably impair the uniform heating of the semiconductor wafer because the gussets impede the heat from being evenly transmitted through the walls of the reactor chamber. This undesirably creates shadows or hot and cold spots within the reactor chamber which causes non-uniform heating of the wafer. The gussets also hinder the cooling of the reactor chamber because the coolant cannot pass over the entire outer surface of the reactor. Instead, the outwardly extending gussets prevent the coolant from cooling some portions of the exterior surface of the reactor chamber, and this may cause an uneven temperature distribution in the walls of the reactor chamber. Further, the quartz gussets, fourteen of which are disclosed in one embodiment of the prior reactor chamber, are typically fused to the outer surfaces of the reactor chamber. Fusing the gussets to the walls is a time consuming and costly process, and this process requires the reactor chamber be annealed at least once during the attachment of the gussets to relieve any thermally induced stresses in the reactor chamber.

It is, therefore, desirable to provide a method of making a reactor chamber that permits even heating, thermal uniformity and heat distribution within the reactor chamber, and uniform cooling of the walls of the reactor chamber.

A need therefore exists to make a reactor chamber which is useful in processing semiconductor wafers at an elevated temperature and non-ambient pressure. A dome surface provides additional strength to avoid distortion under non-ambient pressure processes, and the dome surface reduces the possibility of the reactor chamber developing cracks or breaks. Advantageously, the dome surface does not require gussets, other support members or increased wall thickness to support the reactor chamber during non-ambient pressure procedures. The dome surface also allows for uniform heating and cooling of the reactor chamber because no gussets or support members extend from the walls of the reactor chamber.

A graphite mold may be used to configure a piece of quartz into a dome shape. The graphite mold, however, creates a rough and irregular quartz surface because of the extended contact of the quartz with the graphite surfaces of the mold. The quartz surface must be polished to create a smooth surface, and the polishing of the dome surface is a time consuming and costly process. A need therefore exists to make a quartz dome having a substantially smooth surface that eliminates the need for polishing.

SUMMARY OF THE INVENTION

In accordance with one aspect of the present invention, a method of making a dome for a reactor chamber used in semiconductor processing includes placing a quartz disk on a ring which is then rotated. The disk is heated until the disk is softened slightly and it begins to slump. The softened portion of the disk is drawn by gravity and also optionally by a change in pressure to contact a fixed wiper blade. The contact of the rotating quartz surface and the wiper blade controls the size and shape of the deformation of the disk to create a dome surface.

Another aspect of the invention includes making dome surfaces and joining the dome surfaces to a side wall to create a dome reactor chamber. The side wall can be fused to the dome surfaces by a torch or other heat source. An inlet and outlet may also be provided in the side wall to permit access to the interior of the reactor chamber.

BRIEF DESCRIPTION OF THE DRAWINGS

These and other features of the invention will now be described with reference to the drawings of the preferred embodiment which are intended to illustrate, and not to limit the invention, in which.

DETAILED DESCRIPTION OF PREFERRED EMBODIMENTS

Figure 1:
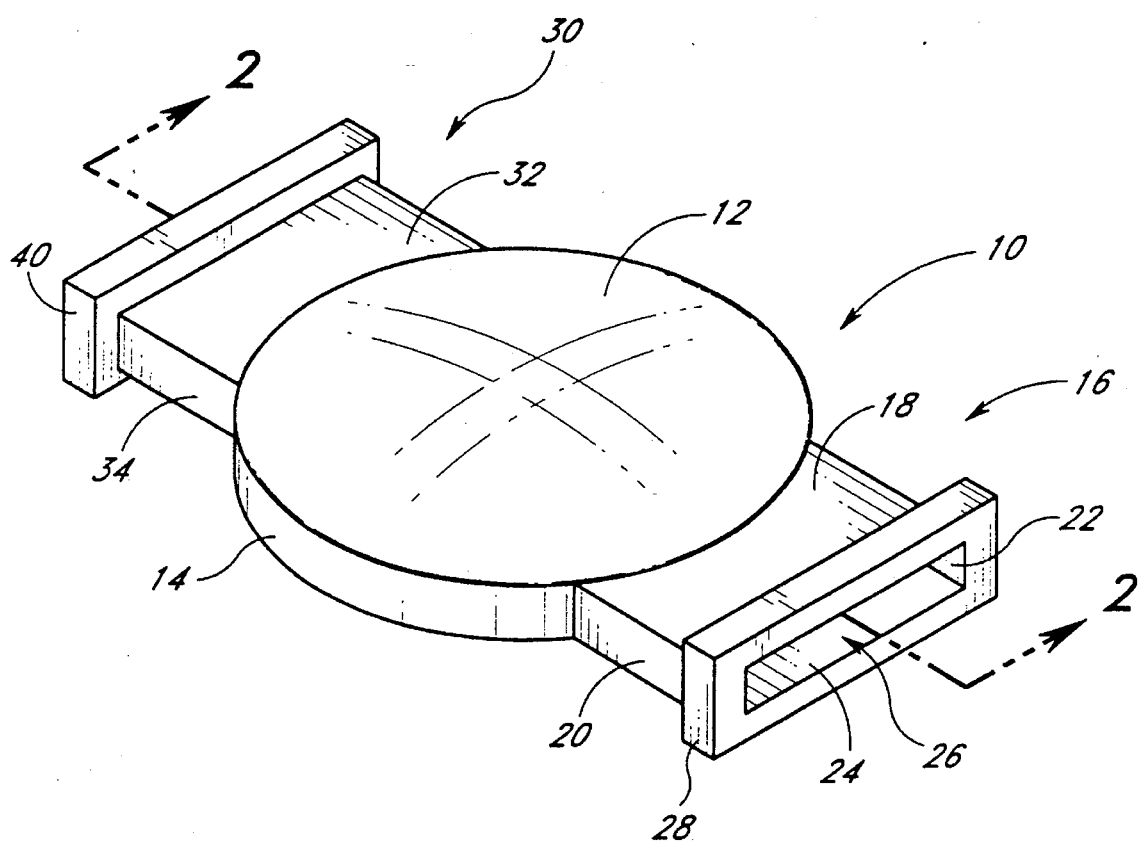
FIG. 1 is a perspective view of a quartz dome reactor chamber for semiconductor processing in accordance with the present invention.
Figure 2:
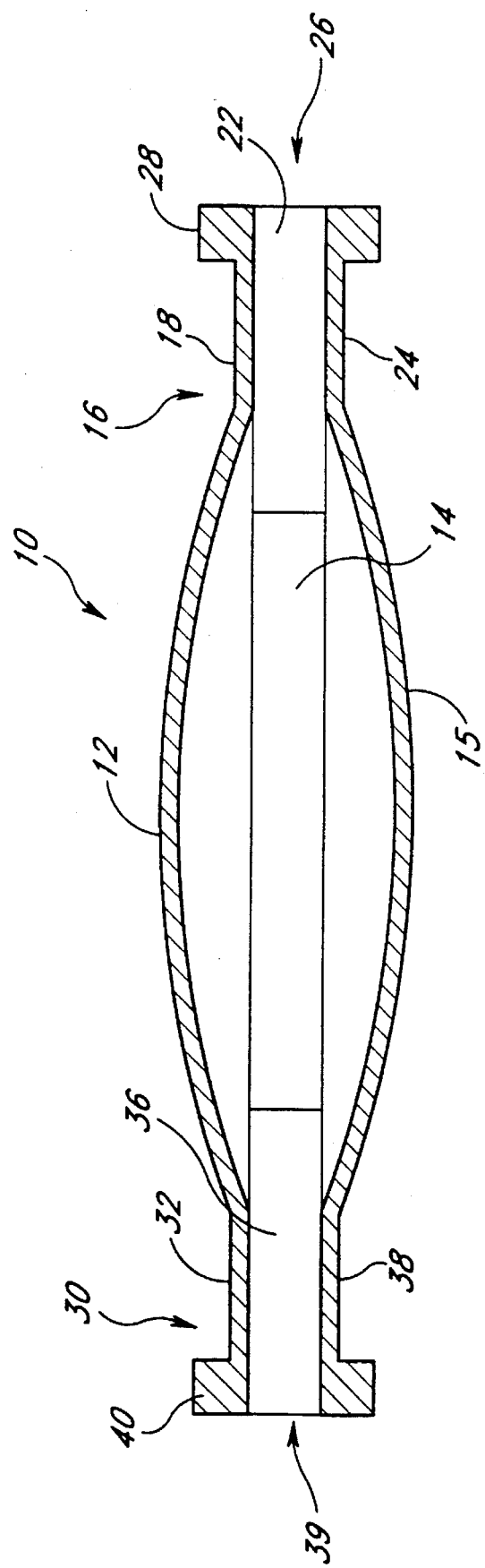
FIG. 2 is a cross-sectional side view along lines 2—2 of FIG. 1.

As seen in FIG. 1, a reactor chamber 10 includes an upper dome surface 12 joined to a side wall 14. The side wall 14 is preferably generally circular and is attached proximate the outer edge of the upper dome surface 12. As seen in FIG. 2, attached to the other end of the side wall 14, distal the upper dome surface 12, is a lower dome surface 15 to form an enclosed reactor chamber 10. As used herein, the terms "upper" and "lower" are used merely for convenience in reference to the accompanying figures, and it will be appreciated that the reactor chamber 10 may be located in a variety of orientations and positions. Additionally, the lower surface of the reactor chamber 10 may be any of a variety of shapes to enclose the reactor chamber 10, such as a flat, concave, convex, asymmetrical and the like surfaces. Preferably, the lower dome surface 15 has the same size and shape as the upper dome surface 12 such that the stress in the walls of the reactor chamber 10 is generally evenly distributed.

Preferably, the dome surfaces 12 and 15 have a diameter of about 13 inches and an arc with approximately a 22 inch radius. This allows the dome surfaces 12 and 15 to be preferably used in an 8 inch reactor chamber. This size and shape is preferred because the dome surfaces 12 and 15 can withstand the non-ambient pressure processing of a semiconductor wafer, and the dome surfaces do not impair the flow of the reactant gases over the wafer. It will be appreciated, however, that a wide variety of shapes and sizes of dome surfaces may be constructed and used in accordance with the present invention. Additionally, the dome surface allows the reactor chamber 10 to be used in a variety of non-ambient conditions, including high pressure and vacuum arrangements.

The walls of the reactor chamber 10 are preferably constructed of quartz. The quartz, which can be either natural or synthetic glass, preferably contains at least 90% silicon dioxide. Advantageously, the quartz can be obtained in very pure form which minimizes contamination of the reactor chamber 10. Additionally, fused silica may be used to construct the reactor chamber 10, but other materials can also be readily used to construct the reactor chamber 10. For instance, other glass compositions or ceramic materials may be used without departing from the scope of the invention.

The side wall 14 is preferably fused to the dome surfaces 12 and 15 by using localized heat from a torch or other heat source. Additional pieces of quartz may be used during the fusing process to create a secure attachment of the side wall 14 to the dome surfaces 12 and 15. This process preferably creates an air tight seal such that non-ambient pressures can be established within the reactor chamber 10.

As seen in FIGS. 1 and 2, radially outwardly extending from the side wall 14 of the reactor chamber 10 is an inlet 16 that may be used to communicate with the interior of the reactor chamber 10. The inlet 16 is preferably rectangular in configuration with an upper wall 18, side walls 20 and 22, and lower wall 24. These walls create an opening or passageway 26 which is in communication with the reactor chamber 10. Preferably outwardly extending from the ends of the inlet 16, located distal from the reactor chamber 10, is a lip 28. The inlet 16 may also be formed of numerous shapes including, for instance, circular, oval or the like.

The inlet 16 is preferably constructed of quartz and is fused to the side wall 14 and the dome surfaces 12 and 15 of the reactor chamber 10 to create a pressure tight seal. Reactant gases may be provided though the inlet 16 and a semiconductor wafer (not shown) may be inserted through the inlet 18 and into the reactor chamber 10. The wafer is preferably supported in the reactor chamber 10 by a susceptor (not shown) such that the wafer lies generally parallel between the dome surfaces 12 and 15.

An outlet 30 to the reactor chamber 10 is preferably located opposite the inlet 16 and the outlet 30 is also in communication with the interior of the reactor chamber 10. The outlet 30 preferably radially outwardly extends from the side wall 14, and is connected to the side wall 14 and the dome surfaces 12 and 15. The outlet 30 is preferably generally rectangular in configuration with an upper wall 32, side walls 34 and 36, and lower wall 38. A central passageway 39 extends through the outlet 30 to communicate with the reactor chamber 10. A lip 40 preferably outwardly extends from the end of the outlet 30 distal the reactor chamber 10. The outlet 30 is preferably constructed of quartz and is fused to the side wall 14 and dome surfaces 12 and 15 of the reactor chamber 10 to create a pressure tight seal. The outlet 30 may provide an exit for the reactant gases by means of an exhaust system (not shown). Additionally, the outlet 30 could be formed in a variety of shapes, such as circular, oval or the like.

The dome surfaces 12 and 15 are desirably used because they allow the reactor chamber 10 to be used for non-ambient pressure operations. The dome surfaces 12 and 15 are able to withstand the stress caused by the pressure differential and the dome surfaces 12 and 15 reduce the possibility of the reactor chamber 10 breaking or cracking because of the pressure differential. The dome surfaces 12 and 15 desirably do not require thickening of the walls of the reactor chamber 10 or the addition of gussets or other supporting members to the outer surface which impair the heating and cooling of the reactor chamber. Thus, the dome surfaces 12 and 15 provide the strength required to prevent distortion of the reactor chamber 10.

Figure 3:
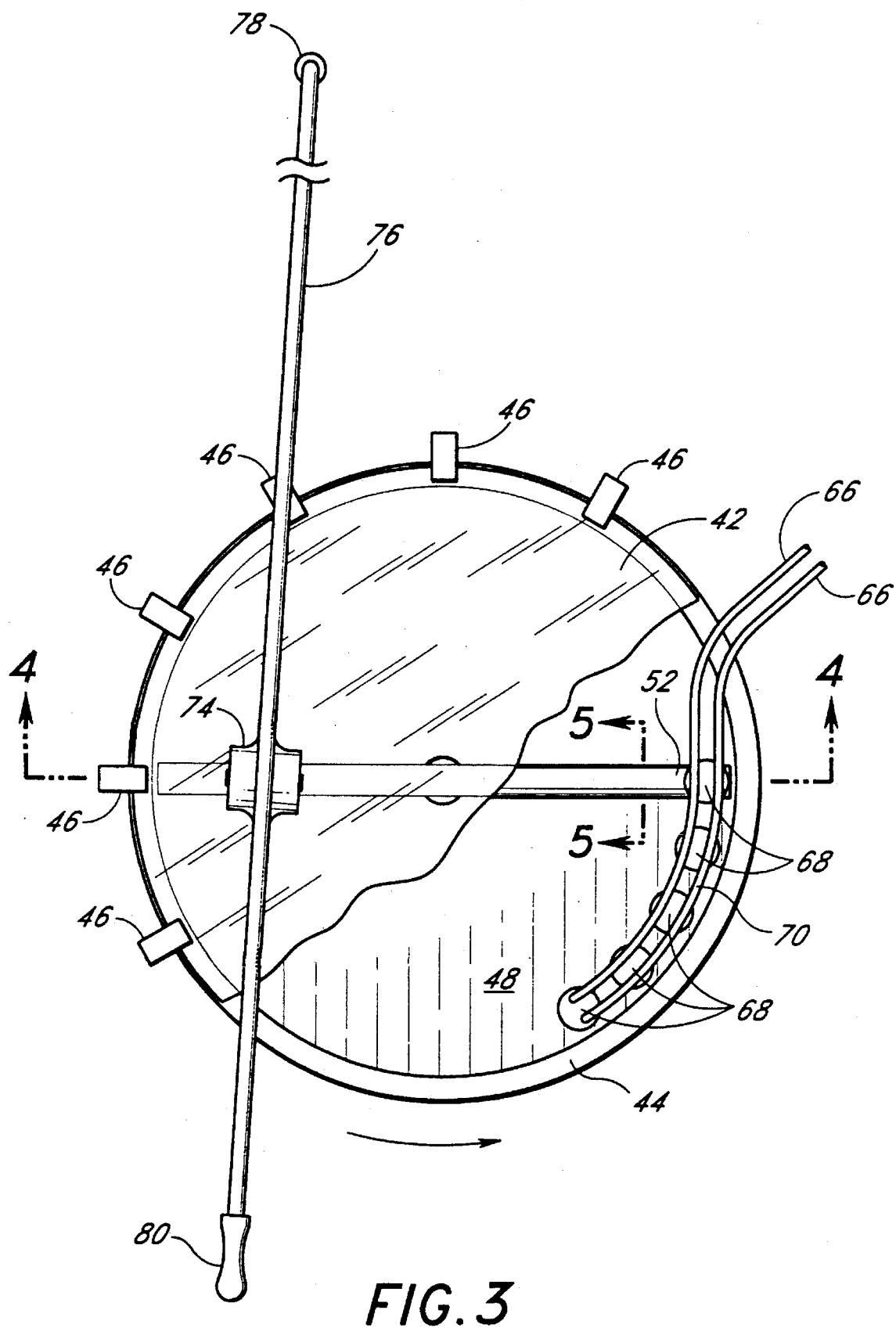
FIG. 3 is a top, plan schematic view illustrating the making of the dome of the reactor chamber of FIG. 1 with the disk partially cut away.
Figure 4:
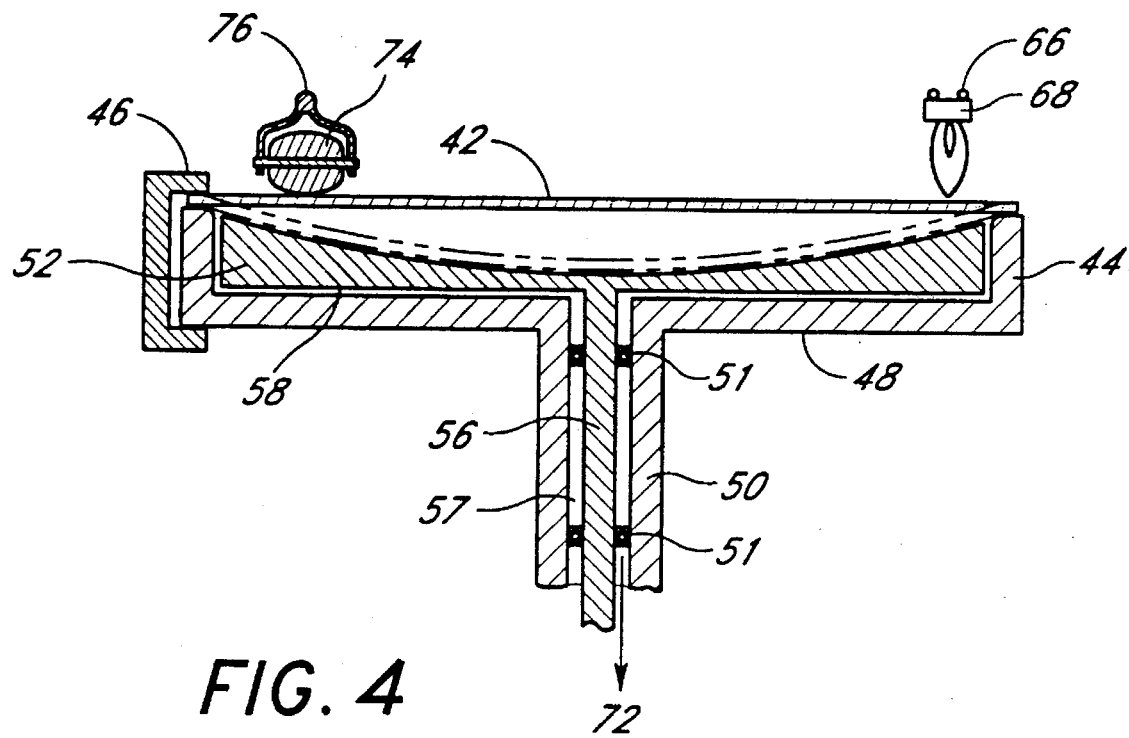
FIG. 4 is a cross-sectional side view along lines 4—4 of FIG. 3.

As seen in FIGS. 3 and 4, the dome of the reactor chamber 10 is constructed by centering a piece of material, preferably a quartz disk 42, on a short cylindrical ring or frame 44 such that the outer edge of the disk 42 is supported by the frame 44. The disk 42 is preferably about 18.5 inches in diameter and about 0.125 inches in thickness. The disk 42 is preferably constructed of quartz having substantially smooth inner and outer surfaces.

A plurality of clamps 46 (only six are shown in the accompanying FIG. 3) may be used to secure the disk 42 to the frame 44. As seen in FIG. 4, the frame 44 is attached to a flat, circular back plate 48, and the back plate 48 is connected to the upper end of a tubular spindle 50. The frame 44 is preferably constructed of graphite because it has a high melting point generally within the range of 3,000° to 4,000° C. that can withstand the heating of the disk 42. It will be appreciated that frame 44 may be made from a wide variety of materials that have the desired characteristics. The back plate 48 is preferably constructed of aluminum, but a wide variety of materials including other metals, ceramics or graphite may be used to make the back plate 48. The frame 44 and back plate 48 are then rotated, such as by connecting the spindle 50 to a motor or other device (not shown), at about 120 rpm. The disk 42 is rotated at the same speed because it is held by the clamps 46 to the frame 44. Of course, the frame 44 may be rotated at different speeds in order to construct the desired dome surface.

Figure 5:
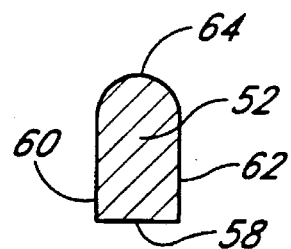
FIG. 5 is a cross-sectional end view along lines 5—5 of the wiper blade of FIG. 3.

As seen in FIGS. 3 and 4, an elongated wiper blade 52 extends diametrically within the frame 44 such that the ends of the blade 52 are located proximate the frame 44. A shaft 56 depends from the center of a straight lower edge 58 of the blade 52, and extends through the spindle 50. A gap or annular space 57 is preferably disposed between the shaft 56 and the spindle 50. The blade 52 is supported in a fixed location by the shaft 56, closely spaced from the frame 44 and the back plate 48, as they rotate about the blade 52. Suitable bearings 51 extend between the spindle 50 and the shaft 56. The wiper blade 52 is preferably constructed of graphite or other material having a high melting point. The shaft 56 may also be constructed of graphite, or a variety of other materials. As seen in FIG. 5, the wiper blade 52 has the straight lower edge 58, two generally parallel side walls 60 and 62, and a rounded upper surface 64. The upper surface 64 of the blade 52 is preferably convex.

As seen in FIGS. 3 and 4, a heating source 66 is provided to heat the disk 42. The schematically illustrated heating source 66 may consist of numerous known sources, such as heat lamps, burners or the like. A heating source 66 including a series of burners 68 utilizing oxygen and hydrogen was successfully used in a prototype system. As seen in FIG. 3, the burners 68 are preferably arranged on a curved member 70. The curved member 70 preferably has generally the same radius of curvature as the outer periphery of the disk 42 so that the burners 68 are substantially aligned with the outer periphery of the disk 42. It will be readily understood that the size and number of hydrogen and oxygen burners 68 to be used is determined by the heating requirements for a given diameter and thickness of disk 42.

In operation, the heating source 66 is preferably first located proximate the outer periphery of the disk 42 and the outer periphery of the disk 42 is heated until the disk 42 begins to slump. As the disk 42 slumps, the heating source 66 is slowly moved radially inwardly towards the center of the disk 42 to continuously control the uniform slumping of the disk 42. As the rotating disk 42 slumps, the disk 42 contacts the stationary wiper blade 52 and the disk 42 is formed into the desired dome shape. The deformed disk 42 is shown in phantom in FIG. 4.

Another aspect of the invention is a change in pressure may be used to draw the disk 42 into contact with the wiper blade 52 by lowering the pressure on the side of the disk 42 proximate the wiper blade 52. As indicated by the arrow 72 in FIG. 4, the change in pressure may be a vacuum which draws through the annular space 57 between the shaft 56 and the spindle 50. The size and shape of the deformation of the disk 42 is controlled by the wiper blade 52.

Additionally, disks that are thicker and/or have a larger diameter may be used with the above-described process. For instance, the heating source 66 may be moved more slowly across a thicker disk such that more heat is absorbed and the disk slumps until it is in contact with the wiper blade 52. Additionally, a larger change in pressure may be utilized to draw the thicker disk into contact with the wiper blade 52.

A further aspect of the invention is a roller 74 may be used to apply a force to the upper surface of the disk 42 to insure the disk 42 contacts the wiper blade 52. As seen in FIGS. 3 and 4, the roller 74 is preferably positioned on the surface of the disk 42 opposing the stationary wiper blade 52. This allows a force to be applied to the disk 42 by the roller 74 such that the slumping disk 42 engages and is properly formed by the wiper blade 52. The roller 74 is preferably constructed from graphite, but other heat resistant materials may be utilized.

As seen in FIG. 3, the roller 74 is mounted on an elongated rod 76. The elongated rod 76 is preferably constructed from a rigid material such as steel, aluminum or the like. The end of the rod 76 distal the disk 42 is preferably mounted to a pivot 78 to allow the rod 76 to move generally horizontally across the surface of the disk 42. A handle 80 is attached to the opposite end of the rod 76 and the handle 80 is configured to allow an operator to move the rod 76 and roller 74 across the surface of the disk 42. Preferably the rod 76 has an extended length such that the movement of the roller 74 relative to the disk 42 is in the form of a small arc. More preferably, the length of the rod 76 is such that the movement of the roller 74 relative to the disk 42 is almost in the form of a straight line.

The axis of rotation of the roller 74 is preferably perpendicular to the axis of the elongated rod 76 and the rotation of the roller 74 is generally aligned with the rotation of the spinning disk 42 such that the spinning disk 42 causes the roller 74 to rotate. In operation, as the operator moves the roller 74 across the surface of the disk 42, a slight slipping or sliding of the roller 74 relative to the disk 42 may occur because the roller 74 rotates in generally the same direction as the spinning disk 42.

Advantageously, the wiper blade 52 forms a substantially smooth surface, because the disk 42 does not stay in prolonged contact with the wiper blade 52, since the disk 42 is rotating relative to the wiper blade 52. Thus, the fixed wiper blade 52 forms a smooth surface on the disk 42 and shapes the rotating disk 42 into the desired dome shape.

Although this invention has been described in terms of certain preferred embodiments, other embodiments apparent to those of ordinary skill in the art are also within the scope of this invention. For example, the disk 42 and the frame 44 may be held stationary while the wiper blade 52 rotates, or the disk 42 and the frame 44 may rotate while the wiper blade 52 also rotates. If the disk 42 is held stationary, an alternate heat source must be utilized to provide uniform heating of the disk.

What is claimed is:

1. A method of making a dome surface for a reactor chamber, said method comprising:

providing a rigid disk made of material which will soften with heat;

supporting an outer edge of said disk on a circular frame;

positioning a wiper blade within said frame spaced beneath said disk;

producing relative rotation between said disk and said wiper blade; and heating said disk to cause said disk to slump and contact said wiper blade to form a dome for said chamber.

2. The method of claim 1, further comprising the step of providing a lower pressure on a lower side of said disk than an upper side of said disk to draw said disk into contact with said wiper blade.

3. The method of claim 1, further comprising the step of providing a roller on an upper side of said disk configured to provide a force on said disk.

4. The method of claim 3, further comprising the step of supporting said roller on an elongated rod.

5. The method of claim 1, wherein said disk is at least partially made from quartz.

6. The method of claim 1, wherein said circular frame is constructed from graphite.

7. The method of claim 1, wherein said wiper blade is constructed of graphite.

8. The method of claim 1, including attaching the edge of said disk to said frame by a plurality of clamps.

9. The method of claim 1, wherein said disk is heated by one or more burners.

10. The method of claim 9, wherein said burners are located on a curved member which is moved radially relative to said disk.

11. The method of claim 1, further comprising the steps of providing a side wall, joining said dome to a first end of said side wall, forming a second dome, and joining the second dome to a second end of said side wall to form the reactor chamber.

12. The method of claim 11, further comprising the step of providing an inlet and an outlet to said side wall.

13. The method of claim 12, further comprising the step of providing a lip to said inlet and said outlet.

14. A method of constructing a dome surface for a reactor chamber, said method comprising:

providing a support ring;

providing a wiper blade within said ring;

positioning a disk across said ring, said disk having an upper surface and a lower surface;

rotating of said disk relative to said wiper blade;

heating said disk such that it slumps and contacts said wiper blade; and forming said disk into said dome surface by contacting said lower surface of said rotating disk with said wiper blade.

15. The method of claim 14, wherein said disk is at least partially made from quartz.

16. The method of claim 14, wherein said ring is constructed from graphite.

17. The method of claim 14, further comprising the step of creating a lower pressure to draw said lower surface of said disk towards said wiper blade.

18. The method of claim 14, wherein said disk is rotated at about 120 rpm relative to said wiper blade.

19. The method of claim 14, wherein said heating decreases from an outer edge of said disk towards a center of said disk.

20. The method of claim 14, wherein said wiper blade is constructed from graphite.

* * * * *